(12) United States Patent
Anderson

(10) Patent No.: US 11,116,124 B2
(45) Date of Patent: Sep. 14, 2021

(54) IMPLEMENT OFFSET ARM

(71) Applicant: Consolidated Equipment Group, LLC, Alexandria, MN (US)

(72) Inventor: Joel A. Anderson, Solway, MN (US)

(*) Notice: Subject to any disclaimer, the term of this patent is extended or adjusted under 35 U.S.C. 154(b) by 230 days.

(21) Appl. No.: 16/556,171

(22) Filed: Aug. 29, 2019

(65) Prior Publication Data
US 2020/0068780 A1 Mar. 5, 2020

Related U.S. Application Data

(60) Provisional application No. 62/724,602, filed on Aug. 29, 2018.

(51) Int. Cl.
| | | |
|---|---|---|
| *A01B 69/00* | (2006.01) | |
| *A01B 59/04* | (2006.01) | |
| *A01B 63/16* | (2006.01) | |
| *A01B 59/00* | (2006.01) | |
| *A01B 59/042* | (2006.01) | |

(52) U.S. Cl.
CPC .......... *A01B 69/003* (2013.01); *A01B 59/002* (2013.01); *A01B 59/042* (2013.01); *A01B 63/16* (2013.01)

(58) Field of Classification Search
CPC ... A01B 69/003; A01B 59/002; A01B 59/042; A01B 63/16
See application file for complete search history.

(56) References Cited

U.S. PATENT DOCUMENTS

| | | | | |
|---|---|---|---|---|
| 1,813,500 | A * | 7/1931 | Lenhart et al. ...... | A01B 59/042 172/624 |
| 1,906,753 | A * | 5/1933 | Johnson ............... | A01B 59/042 280/412 |
| RE19,550 | E * | 4/1935 | Johnson ............... | A01B 59/042 280/412 |
| 2,357,761 | A * | 9/1944 | Peacock ............... | A01B 59/042 280/412 |
| 2,430,143 | A * | 11/1947 | Rutter .................. | A01B 59/042 280/462 |
| 3,568,776 | A * | 3/1971 | Vassberg .............. | A01B 59/042 172/285 |
| 4,366,877 | A * | 1/1983 | Vissers et al. ....... | A01D 34/866 172/125 |
| 7,334,645 | B2 | 2/2008 | Stevenson et al. | |

OTHER PUBLICATIONS

Degelman Operator Manual & Parts Catalog Sidearm 1800, Degelman Industries Ltd., Regina, SK, Canada, Oct. 30, 2008.

* cited by examiner

*Primary Examiner* — Tara Mayo-Pinnock
(74) *Attorney, Agent, or Firm* — Carlson, Caspers, Vandenburgh & Lindquist, P.A.

(57) ABSTRACT

An offset arm for a tractor is provided. The offset arm includes a front hitch, a rear hitch, and a rigid connecting structure coupling the front hitch to the rear hitch. The offset arm also includes a front pivot point pivotally connecting the connecting structure to the front hitch about a vertical pivot axis and a rear pivot point pivotally connecting the connecting structure to the rear hitch about a vertical pivot axis. The offset arm also includes a rear pivot lock that selectively locks the rear pivot point to lock the orientation of the rear hitch relative to the connecting structure. The rear pivot lock can selectively lock the rear hitch in any of multiple orientations.

20 Claims, 14 Drawing Sheets

IMPLEMENT OFFSET ARM

RELATED APPLICATIONS

This application claims the benefit of U.S. Provisional Application No. 62/724,602, entitled "IMPLEMENT OFFSET ARM", and filed on Aug. 29, 2018, which is hereby incorporated herein by reference.

BACKGROUND

One of the primary uses of a tractor is to pull implements that perform various tasks. Example implements include a mower, rake, disc, seeder, and sprayer. Oftentimes, the implement is connected directly to the tractor and extends out evenly in both lateral directions behind the tractor. As used herein a "lateral direction" for a tractor is a direction generally parallel to the ground and perpendicular to the forward motion of the tractor. In some situations, it is desirable for the implement to be offset in the lateral direction from the tractor, such that the ground covered by the implement is not centered behind the tractor. Some implements are designed so that when they are directly connected to the tractor, the ground they cover is offset from the tractor. For other implements, offset arms can be connected between the tractor and the implement to set the lateral position of the implement off the center axis (of forward motion) of the tractor.

BRIEF DESCRIPTION

Embodiments for an implement for a tractor are provided. The implement includes a front hitch and a rear hitch. The front hitch is for connecting to a hitch on a tractor and includes an orientation lock to lock the orientation of the front hitch to the orientation of the hitch on the tractor. The rear hitch is for connecting to a hitch of a second implement and includes an orientation lock to lock the orientation of the rear hitch to the orientation of the hitch of the second implement. The implement also includes a rigid connecting structure coupling the front hitch to the rear hitch, a front pivot point pivotally connecting the connecting structure to the front hitch about a vertical pivot axis, and a rear pivot point pivotally connecting the connecting structure to the rear hitch about a vertical pivot axis. The implement also includes a rear pivot lock that selectively locks the rear pivot point to lock the orientation of the rear hitch relative to the connecting structure, wherein the rear pivot lock selectively locks the rear hitch in any of multiple orientations.

Embodiments for an offset arm for a tractor are also provided. The offset arm includes a front hitch configured to removably connect to a tractor such that the orientation between the tractor and the front hitch is fixed about at least two of the three perpendicular axes. The offset arm also includes a rear hitch configured to removably connect to an implement such that the orientation between the implement and the rear hitch is fixed about at least two of the three perpendicular axes. The offset arm also includes an elongated rigid structure, a front pivot point coupling the front hitch to the elongated structure, and a rear pivot point coupling the rear hitch to the elongated structure. The front pivot point allows pivoting between the front hitch and the elongated structure about a first vertical axis with respect to the offset arm. The rear pivot point allows pivoting between the rear hitch and the elongated structure about a second vertical axis with respect to the offset arm. The rear pivot lock selectively locks the rear pivot point to prevent pivoting about the vertical axis at the rear pivot point. The offset arm also includes an actuator configured to be communicatively coupled to the tractor, such that the rear pivot lock can be locked and unlocked on-demand by an operator of the tractor during operation of the tractor.

DRAWINGS

Understanding that the drawings depict only exemplary embodiments and are not therefore to be considered limiting in scope, the exemplary embodiments will be described with additional specificity and detail through the use of the accompanying drawings, in which.

Figure 11A:
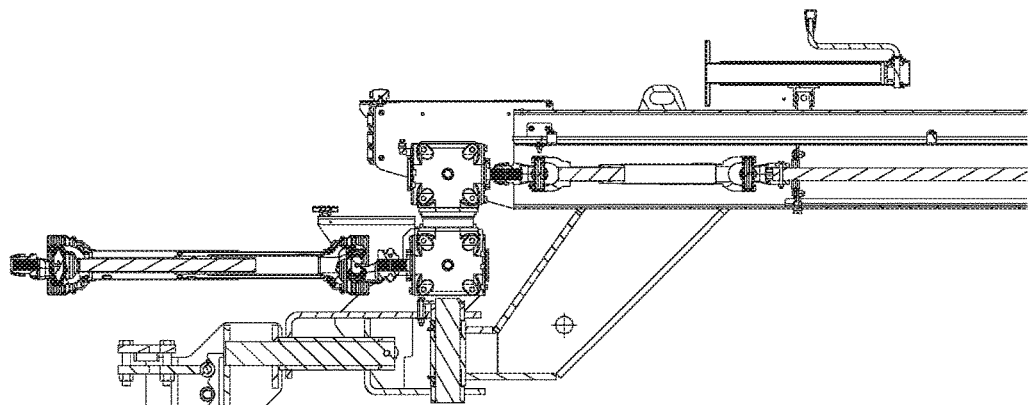
Figure 11B:
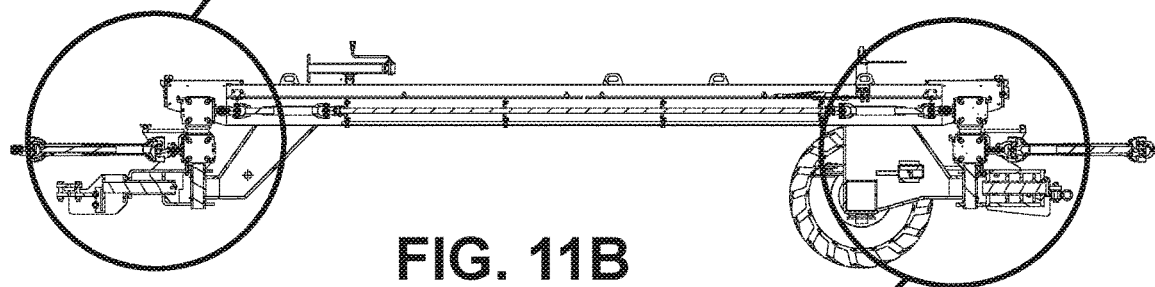
Figure 11C:
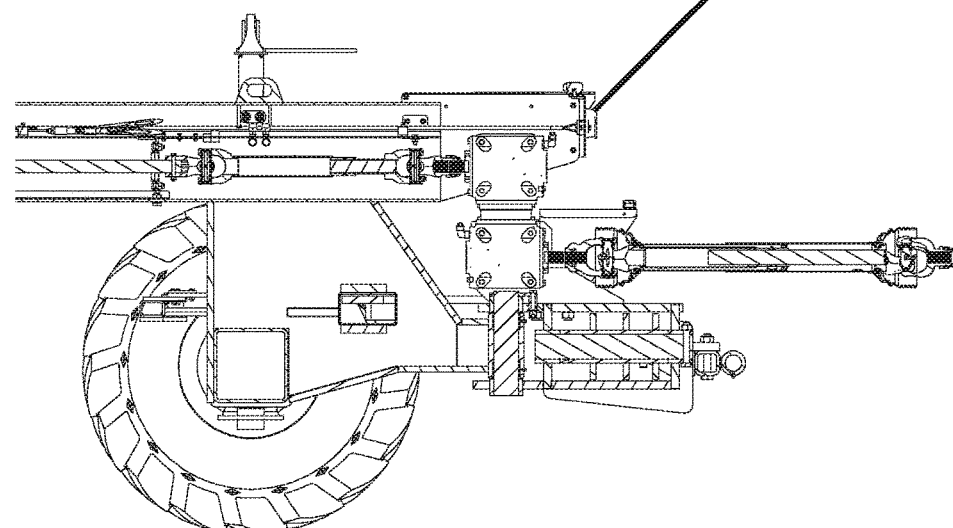
Figure 12:
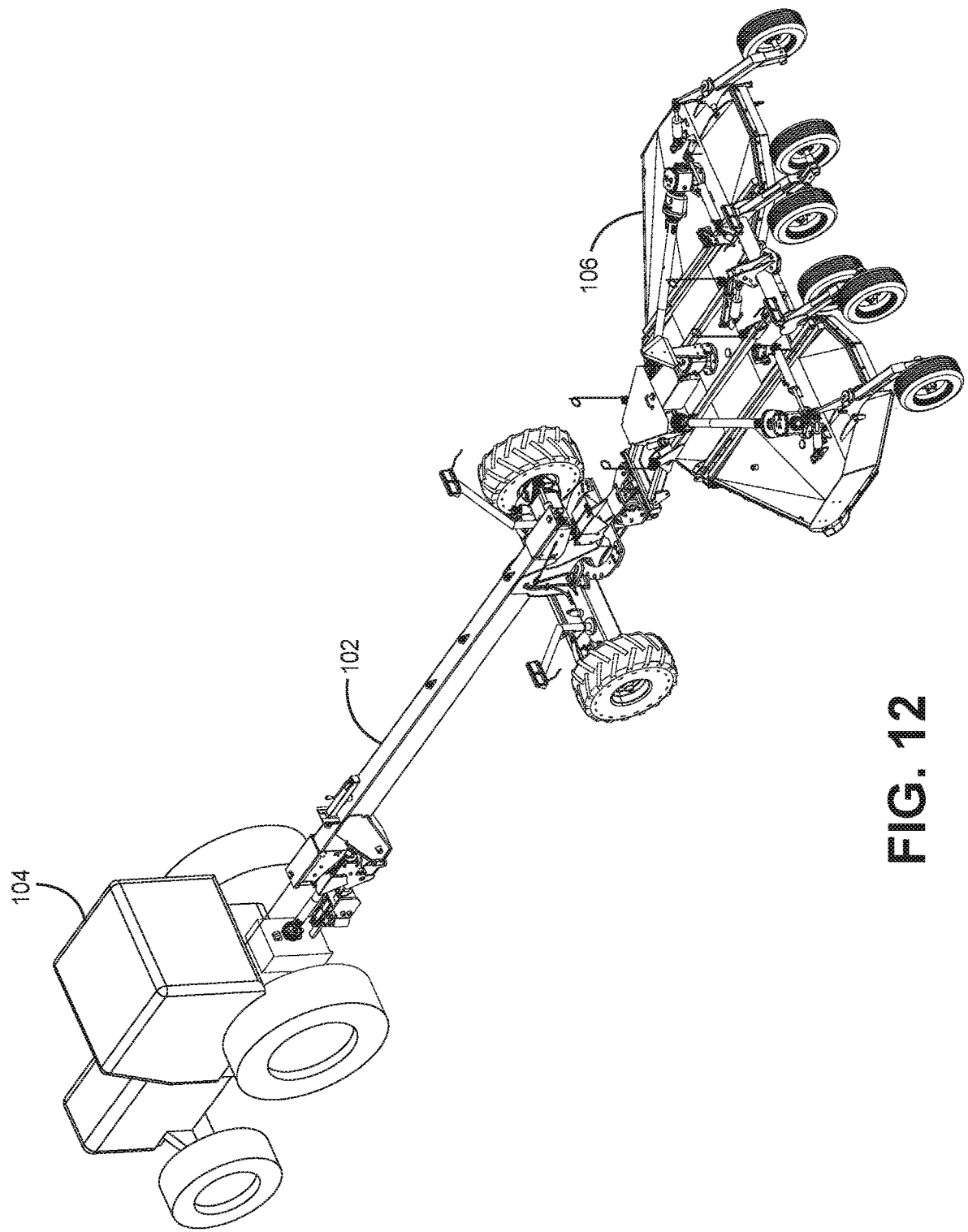
Figure 13A:
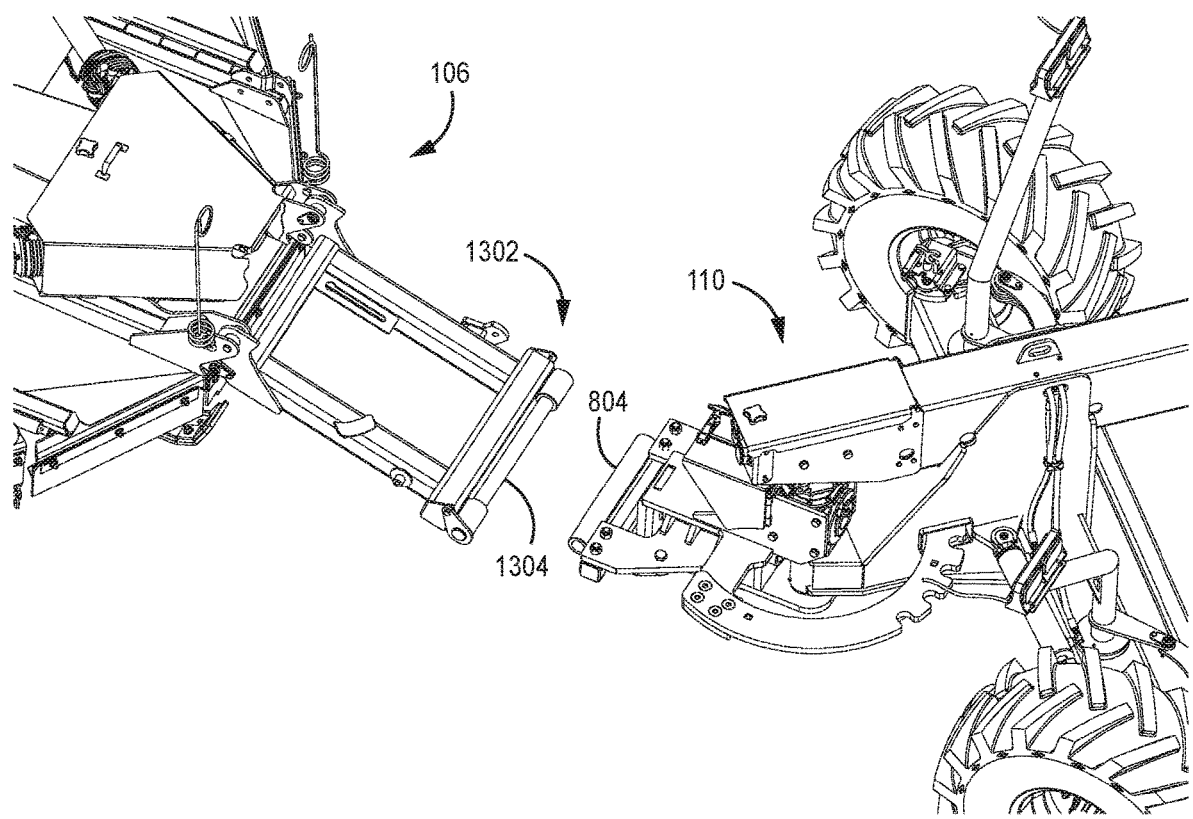
Figure 13B:
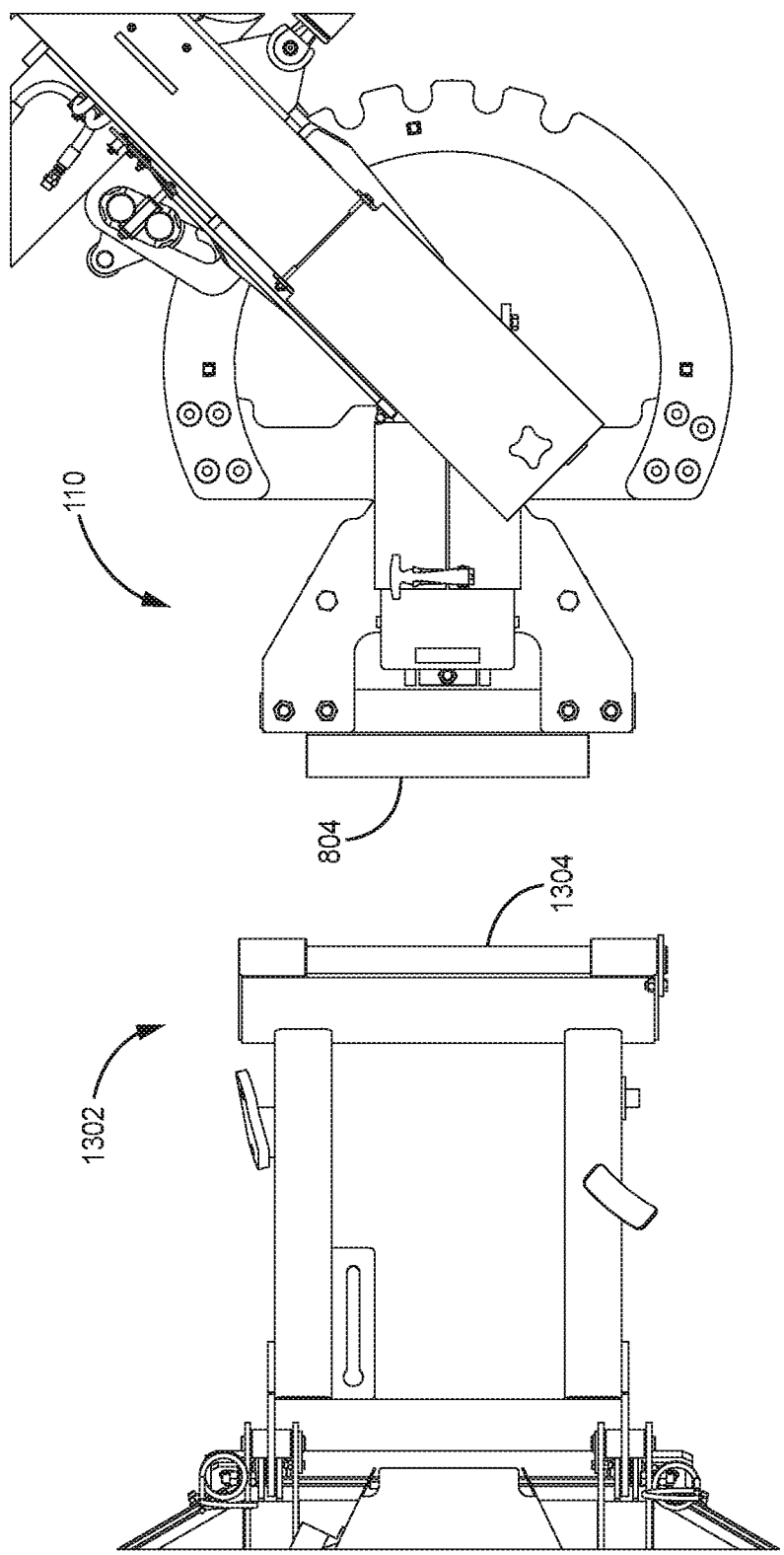
Figure 13C:
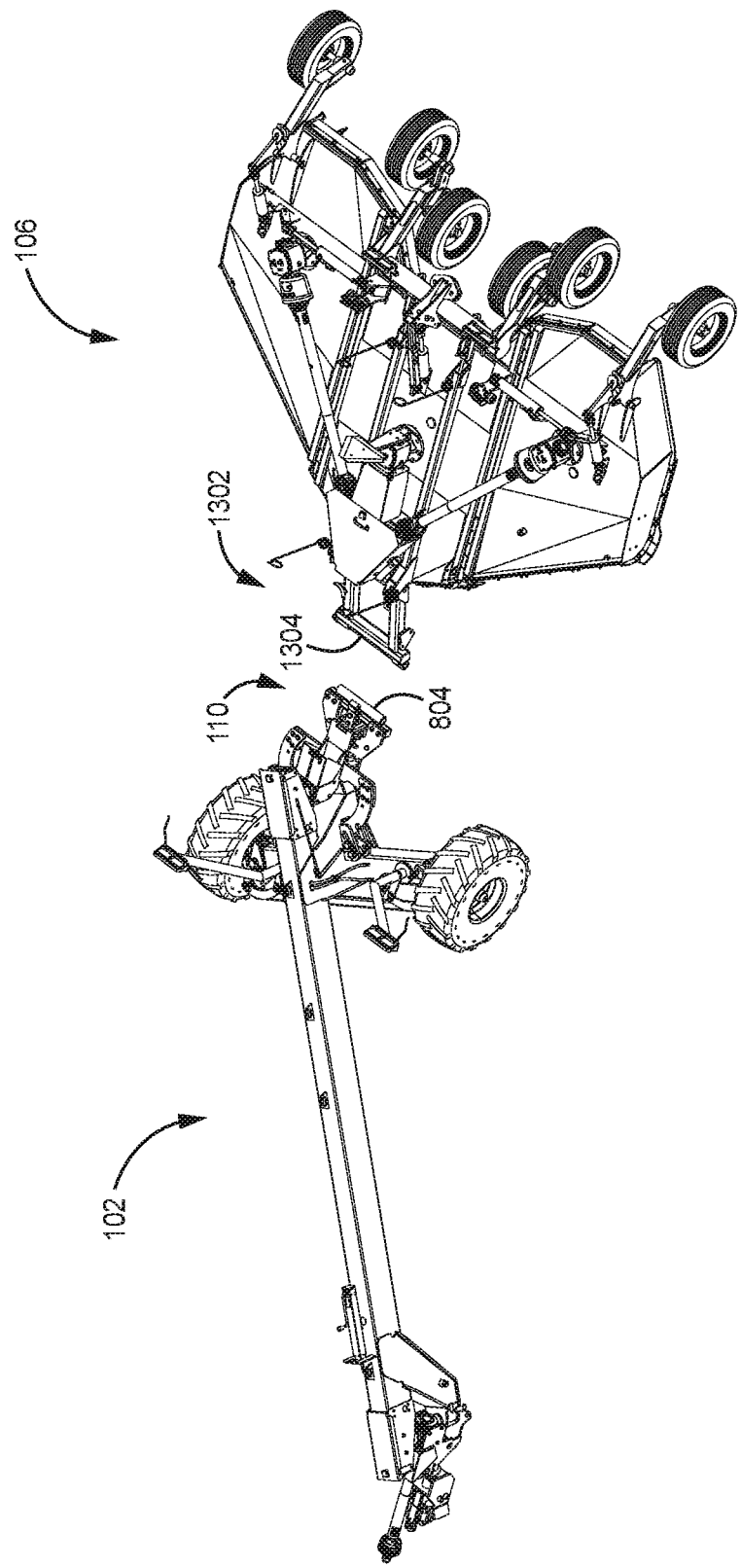

FIGS. 11A, 11B, and 11C are side views of the front and rear swivel gearboxes of the offset arm;

FIG. 12 is a perspective view of the offset arm coupled between a tractor and an implement;

FIGS. 13A, 13B, and 13C are views showing an example rear hitch of the offset arm disconnected from and aligned with a hitch of an implement.

DETAILED DESCRIPTION

Figure 1:
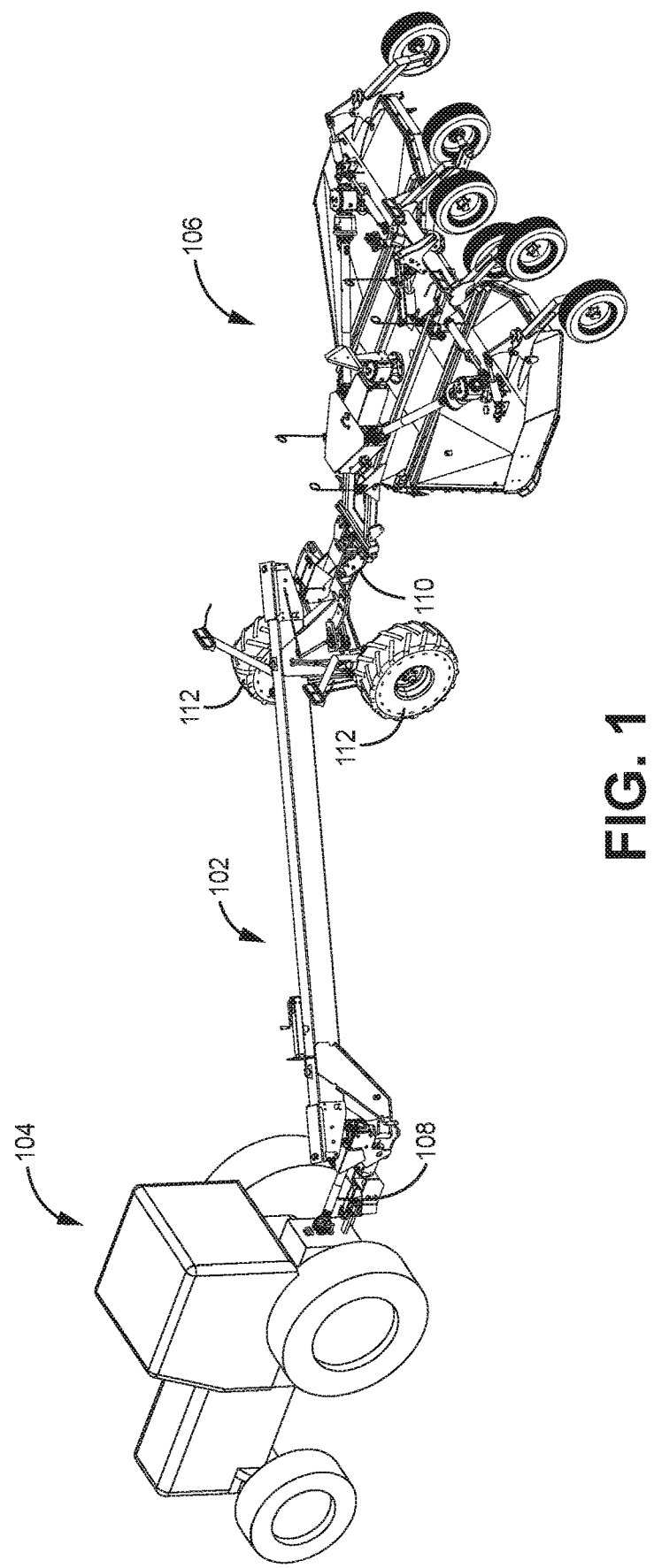
FIG. 1 is a perspective view of an example offset arm connected to a tractor and an implement.
Figure 2:
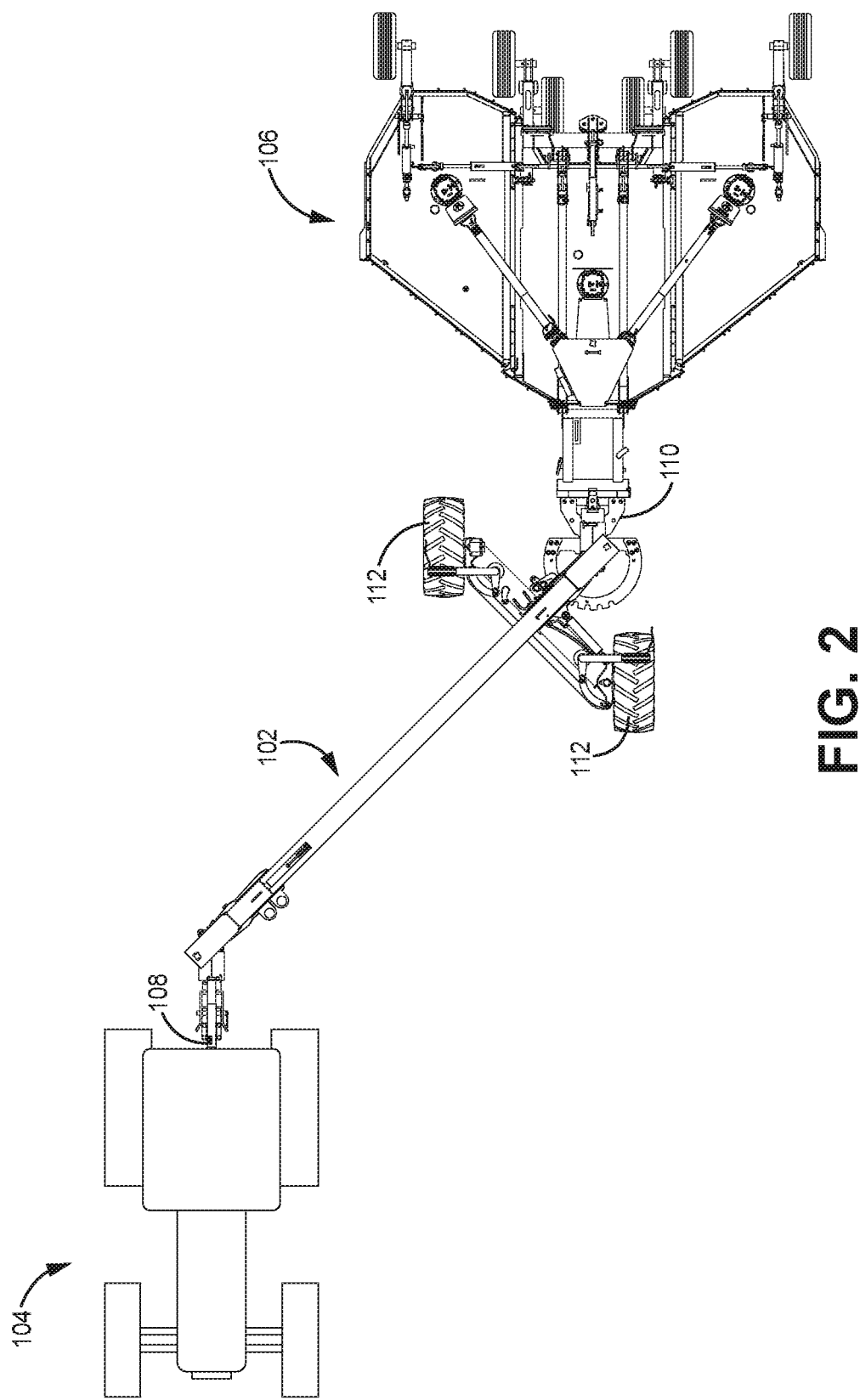
FIG. 2 is a top view of the example offset arm, tractor, and implement of FIG. 1.

FIG. 1 is a perspective view and FIG. 2 is a top view of an example offset arm 102 for offsetting an implement 106 relative to a tractor 104. The offset arm 102 can be connected between the tractor 104 and the implement 106. The tractor 104 includes a single-point hitch 108 (e.g., a drawbar, tow bar) for connection of the implement 106. The tractor 104 can be any suitable tractor capable of pulling the desired implement 106. Example tractors 104 include, but are not limited to, a large or small farm tractor or lawn tractor. The implement 106 is configured to connect to the single-point hitch 108 of the tractor and to be pulled by the tractor 106 to perform the desired function. In this example, the implement 106 is a mower (finishing mower) powered by the power-take-off (PTO) of the tractor 104. In other examples other implements can be used including, but not limited to, a mower (finishing, brush, reciprocating, reel), rake, seeder, sprayer, aerator, disc, drag, blade, cultivator, plow, baler, or trailer. The implement can be PTO powered or non-PTO powered (e.g., self-powered or non-powered).

When using the offset arm 102, the implement 106 is not directly connected to the single-point hitch 108 of the tractor 104. Instead, the offset arm 102 is connected to the single-point hitch 108 of the tractor 104 and the implement 106 is connected to a single-point hitch 110 of the offset arm 102. The offset arm 102 provides a single point-hitch 110 that can be selectively offset in the lateral direction from the single-point hitch 108 of the tractor 104.

Figure 3:
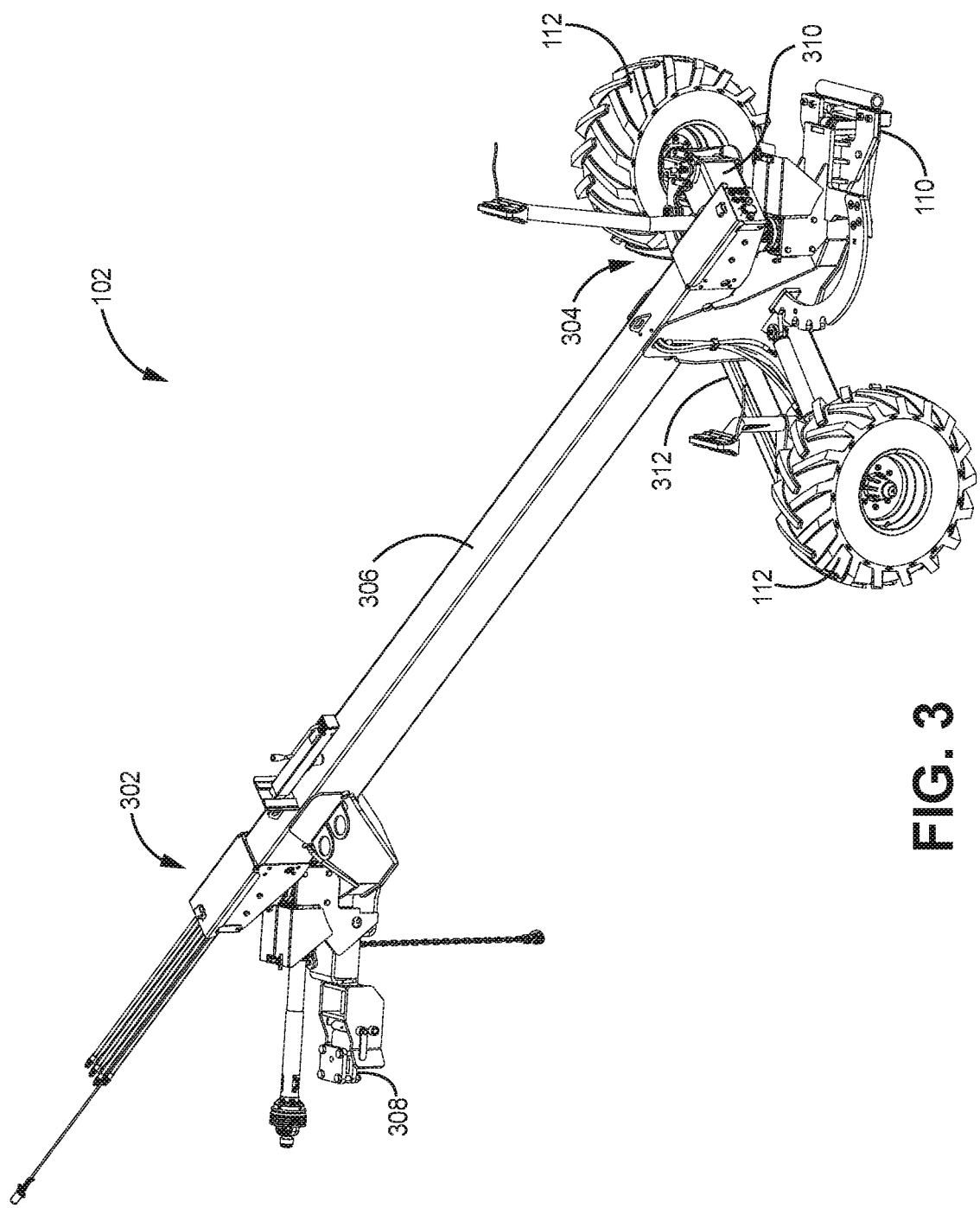
FIG. 3 is a perspective view of the example offset arm of FIG. 1.

FIG. 3 is a perspective view of the offset arm 102 disconnected from a tractor 104 and implement 106. The offset arm 102 has a front end 302 and a back end 304 with a rigid connecting structure therebetween. The front end 302 includes a front single-point hitch 308 for connecting to a single-point hitch 108 of a tractor 104. The back end 304 includes a rear hitch 110 to connecting to a hitch of an implement 106. The rigid beam 306 is an elongated member that rigidly couples together the front single-point hitch 308, the rear hitch 110, and the one or more wheels 112 of the offset arm 102. In the example shown in FIG. 3, the connecting structure includes connecting beam 306 extending generally between the front hitch 108 and the rear hitch 110 and a crossbar 310 that is fixed (in an immovable manner) to the connecting beam 306 to couple the wheels 112 to the connecting structure.

Figure 10:
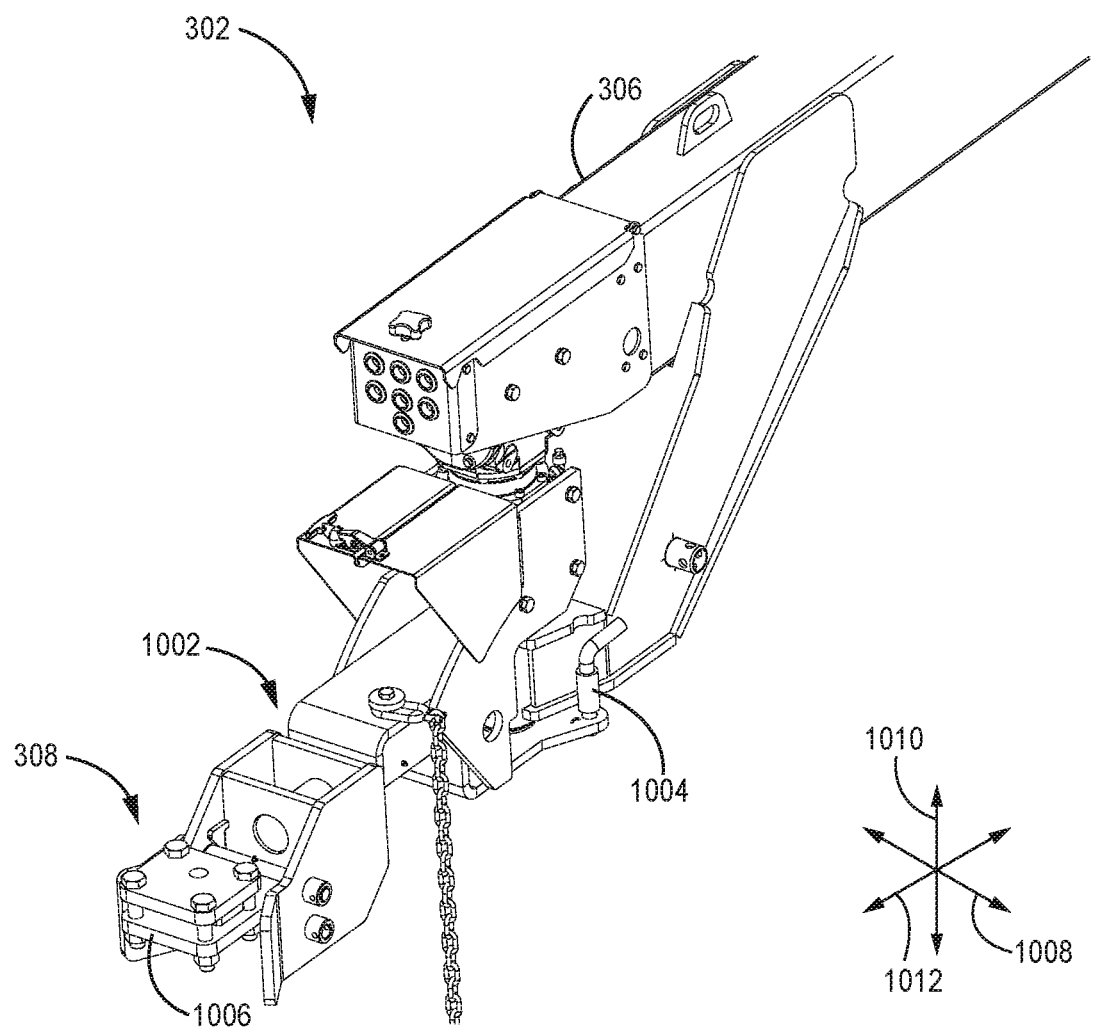
FIG. 10 is a perspective view of the front end of the offset arm.

FIG. 10 is an enlarged perspective view of an example front hitch 308. The front hitch can include an orientation lock 1006, which locks the orientation of the front hitch 308 to the orientation of the tractor hitch 108. The example orientation lock 1006 shown in FIG. 10 includes parallel plates which are secured to/around an elongated hitch to hold the front hitch 208 in the same orientation as the tractor hitch 104. While the orientation lock 1006 is secured to the tractor hitch 108, the orientation of the front hitch 308 is fixed to the orientation of the tractor hitch 108, such that the front hitch 308 and the tractor hitch 108 form a solid non-pivoting structure. The orientation lock 1006 causes the connection between the front hitch 308 and the tractor hitch 108 to function differently than a typical single-point hitch without an orientation lock. A typical connection to a single-point hitch without an orientation lock allows the implement hitch to pivot freely about the axis of connection between the implement hitch and the tractor hitch. The orientation lock 1006 on the front hitch 308 of the offset arm 102 locks the orientation of the two hitches 308, 108 together, such that no pivoting occurs about the axis of connection between the hitches 308, 108. The example orientation lock 1006 shown in FIG. 10 provides zero degrees-of-freedom (DOF) between front hitch 308 and the tractor hitch 108. Thus, the example orientation lock 1006 locks the orientation about the horizontal 1008, vertical 1010, and forward/backward 1012 axes of the hitches 308, 108, wherein the horizontal 1008, vertical 1010, and forward/backward 1012 axes are three perpendicular axes. The front hitch 308 can include a forward/backward axis pivot point 1002 for use with a zero DOF orientation lock 1006 to provide for pivoting about the forward/backward axis 1012 of the tractor. In an example, the forward/backward axis pivot point 1002 allows pivoting of at least 30, 60, 90, or 180 degrees about the forward/backward axis 1012.

The horizontal axis 1008, vertical axis 1010, and forward/backward axis 1012 when used with respect to the front hitch 108 correspond to the general orientation of the tractor 104 regardless of the orientation of the ground below the tractor 104 and/or implement 106. Thus, in situations where the offset arm 102, tractor 104, and/or implement 106 are disposed on a slope, the "vertical" orientation with respect to the front hitch 108 may well be disposed at an angle relative to a vertical axis extending through the center of the earth. The forward/backward axis and horizontal axis could be similarly skewed with respect to the earth's axes.

Although the example orientation lock 1006 having two plates that are secured to/around the tractor hitch 108 is shown, other orientation locks can be used, such as one or more plates that bolt to the tractor 102, one or more arms that are secured to the tractor 102, and other structures. Another example orientation lock of the front hitch 308 can lock the orientation about the horizontal axis 1008 and the vertical axis 1010 and allow pivoting about the forward/backward axis 1012. Such one-axis pivoting orientation lock essentially incorporates the forward/backward axis pivot point 1002 into the orientation lock, such that the forward/backward axis pivot point 1002 is not included in the front hitch 308. In any case, the front hitch 308 with the orientation lock 1006 locks the orientation of the front hitch 308 to the orientation of the tractor hitch 108 about at least two of the three perpendicular axes 1008, 1010, 1012.

Figure 8:
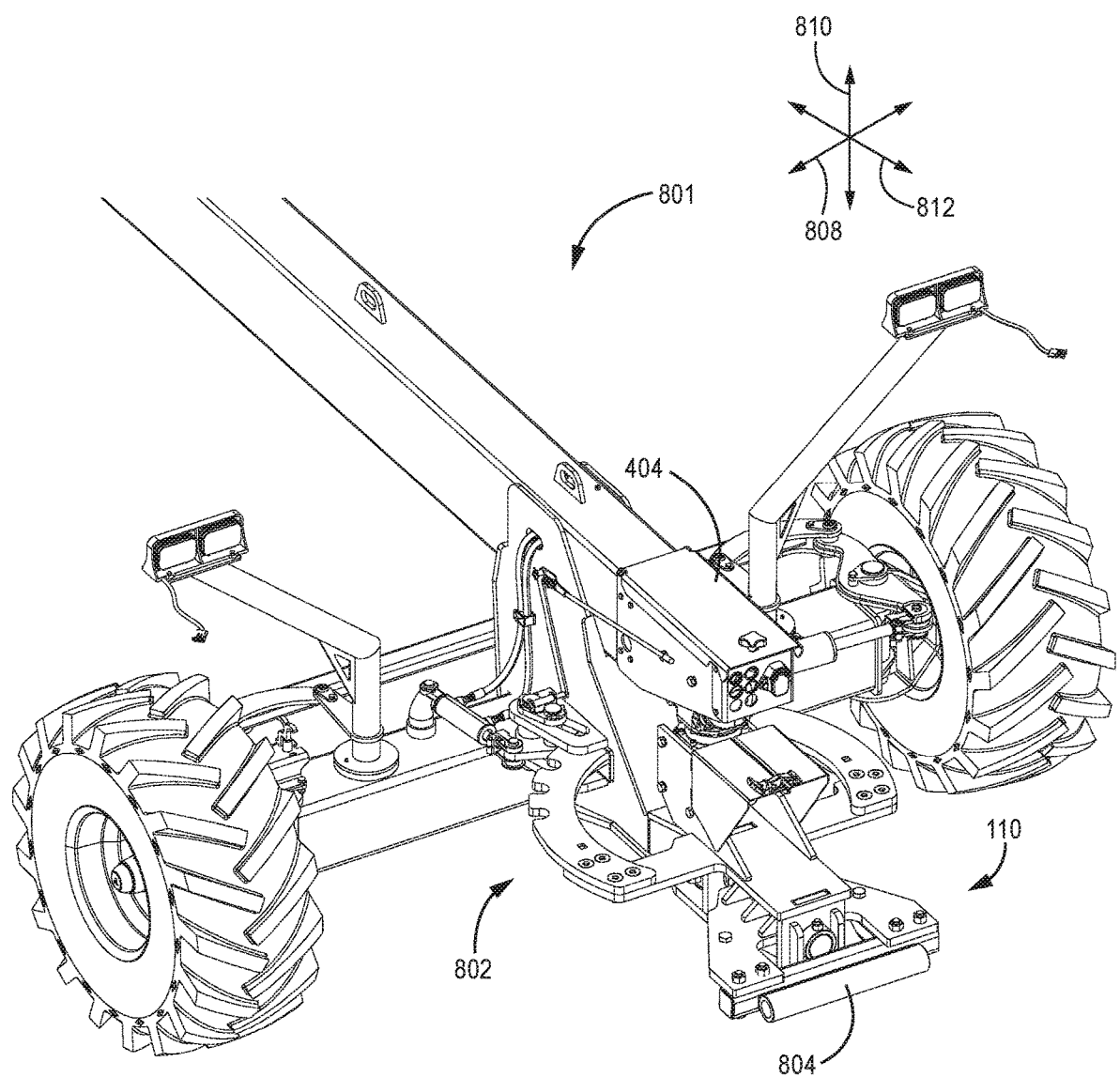
FIG. 8 is a perspective view of an example rear hitch of the offset arm.

FIG. 8 is an enlarged perspective view of an example rear hitch 110. FIGS. 13A, 13B, and 13C are respective views of the example rear hitch 110 disconnected from and aligned with an example hitch 1302 of the implement 106. The rear hitch 110 can include an orientation lock 804, which locks the orientation of the rear hitch 110 to the orientation of the implement hitch 1302. The example orientation lock 804 shown in FIG. 8 includes an elongated generally horizontally disposed hollow bar that is fixed in an immobile manner to the rear hitch 110. The implement hitch 1302 can include a mating rod 1304 that extends through the longitudinal aperture of the bar to secure the implement hitch 1302 to the rear hitch 110. With the mating rod 1304 extending through the longitudinal aperture of the horizontal bar, the orientation of the rear hitch 110 is locked to the orientation of the implement hitch 1302 about the vertical 810 and forward/backward 812 axes. In an example, the mating rod 1304 has a cylindrical exterior geometry to allow pivoting about the horizontal axis 808. The pivoting about the horizontal axis 808 allows the position of the implement to adjust for relative changes in elevation between the tractor 104 and the implement 106. In other examples, the orientation lock of the rear hitch 110 can lock the orientation of the rear hitch 110 to the implement hitch 1302 about all three perpendicular axis 808, 810, 812. Although an example orientation lock for the rear hitch 110 is shown, other orientation locks can be used including a plate or arms that are secured to the implement 106. The horizontal axis 1008, vertical axis 1010, and forward/backward axis 1012 when used with respect to the rear hitch 110 and front and rear pivot points (402, 404 below) correspond to the general orientation of the offset arm 104 regardless of the orientation of the ground below the tractor 104, offset arm 102 and/or implement 106. Thus, in situations where the offset arm 102, tractor 104, and/or implement 106 are disposed on a slope, the "vertical" orientation with respect to the rear hitch 110 and front and rear pivot points 402, 404 may well be disposed at an angle relative to a vertical axis extending through the center of the earth. The forward/backward axis and horizontal axis could be similarly skewed with respect to the earth's axes.

Figure 4:
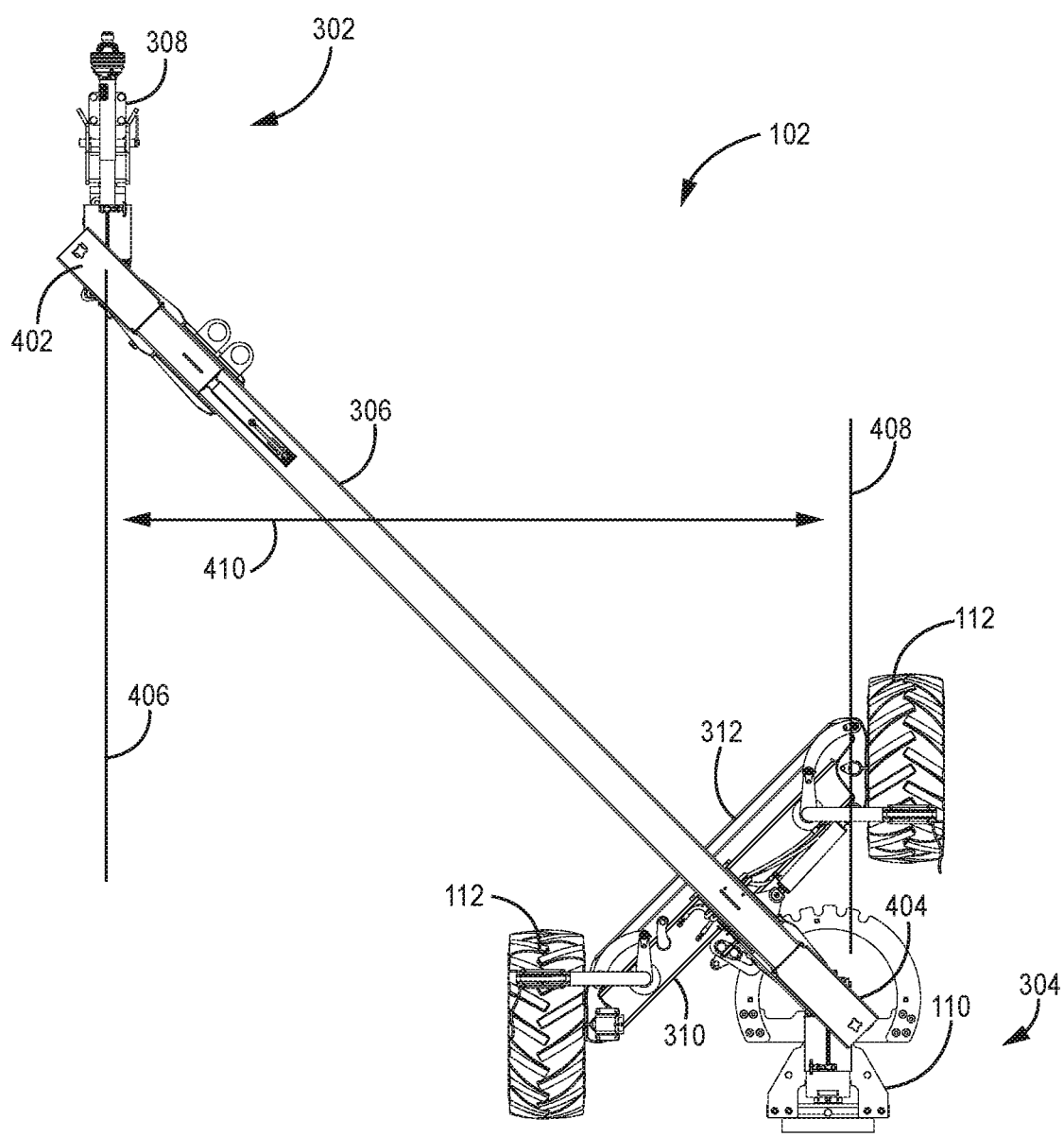
FIG. 4 is a top view of the example offset arm of FIG. 1 showing the offset arm in a position that provides an offset for an implement connected thereto.

FIG. 4 is a top view of the offset arm 102 showing the arm 102 in a position that provides an offset for an implement 106 from the tractor 104. The offset arm 102 provides front and rear pivot points 402, 404, which are distinct from the front and rear hitch connection points, which allow the connecting beam 306 to be positioned at an angle with respect to the forward motion of the tractor 104 and the implement 106. The front and rear pivot points 402, 404 enable the connecting beam 306 to be disposed at an angle with respect to the axis 406 of forward motion of the front hitch 308 of the arm 102. While the offset arm 102 is connected to, and being pulled by, a tractor 104, the axis 406 of forward motion of the front hitch 308 is also the axis of forward motion of the tractor 104. The connecting beam 306 is also disposed at an angle with respect to the axis 408 of forward motion of the rear hitch 110 of the arm. While the offset arm 102 is connected to, and being pulled by, a tractor 104, the axis 408 of forward motion of the rear hitch 110 is also the axis of forward motion of the implement 106. By being disposed at an angle, the length of the beam 306 provides a lateral offset 410 for the rear hitch 110 relative to the front hitch 308. The lateral offset is provided by the length of the beam 306 and the angle of the beam 306 relative to the axis 406 of forward motion of the front hitch 302. In an example, the beam 306 is at least 2 feet long. In a particular example, the beam 306 is 5-20 feet long.

Since the front hitch 308 and the rear hitch 110 connect to the tractor 104 and implement 106 in a manner that does not allow pivoting, the axis 406 of forward motion of the front hitch 308 is also the axis of forward motion of the tractor hitch 108, which is typically the central axis of forward motion of the tractor 104. Likewise, the axis 408 of forward motion of the rear hitch 110 is also the axis of forward motion of the implement hitch and the implement itself. Accordingly, the angled position of the connection beam 306 positions the implement 106 at a lateral offset 410 from the tractor 104. Although an example lateral offset of 168.5 inches is shown, other lengths of beam 306 and angles of disposition can be used to achieve offsets of different lengths. Notably, the offset arm 102 enables the offset to be changed dynamically by an operator of a tractor 104 while the offset arm 102 and any implement 106 connected thereto are being pulled by the tractor 104.

In an example, the offset arm 102 includes a front pivot point 402 and a rear pivot point 404 about which the connecting beam 306 pivots relative to the front hitch 308 and rear hitch 110. The front and rear pivot points 402, 404 can be used in combination with a non-pivoting front and rear hitch 308, 110 to provide a low-wear connection for a PTO shaft between the tractor 104 and the implement 106. By not pivoting about the axis of connection between the front/rear hitch 308/110 and their respective tractor/implement hitch 108/112, the PTO connection between the offset arm 102 and the tractor/implement is maintained in a stationary alignment with the tractor 104 or implement 106 respectively. Thus, the PTO connection between the front end 302 of the offset arm 102 and the tractor 104 is generally stationary (i.e., it does not move in the lateral, vertical, or forward/back direction relative to the tractor 104). Similarly, the PTO connection between the back end 304 and the implement 106 is generally stationary (it does not move in the lateral, vertical, or forward/back direction relative to the implement 106). Instead, the PTO rotation is translated from rotating about the central forward axis (402) of the tractor 104 to rotating about the forward axis (404) of the implement 404 at the pivot points 402, 404 of the offset arm 102. In an example, the front and rear pivot points 402, 404 each allow pivoting of at least 30, 60, 90, or 180 degrees about their respective vertical axes.

The front and rear pivot points 402, 404 each include a swivel gearbox that translates the PTO rotation between a PTO shaft running parallel to the connecting beam 306 and the PTO shafts that connect to the tractor 104 and implement 106 respectively. To allow the beam 306 to angle with respect to the tractor 104 and implement 106, the swivel gearboxes translate the PTO rotation to a vertical direction at the front and rear pivot points 402, 404 and allow connecting beam 306 to pivot about the vertical axis of this PTO rotation. In other examples, the offset arm 102 does not provide a PTO connection between the tractor 104 and the implement 106.

Figures 5, 6A, 6B:
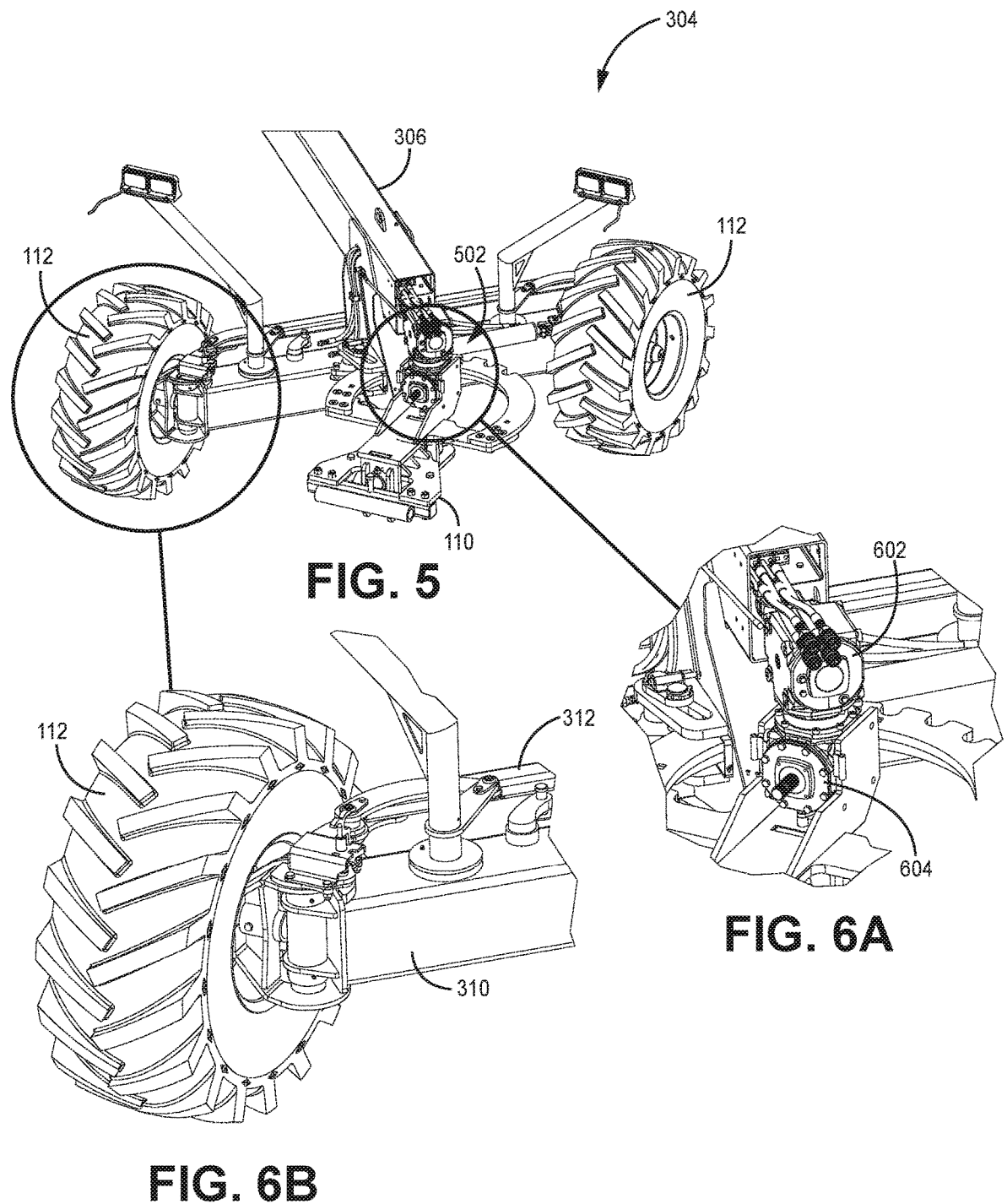
FIG. 5 is a perspective view of an example back end of the offset arm of FIG. 1.
FIG. 6A is an enlarged perspective view of an example swivel gearbox in the rear end of the offset arm.
FIG. 6B is an enlarged perspective view of an example wheel of the offset arm of FIG. 1.

FIG. 5 is a perspective view of a back end 304 of the offset arm 102 showing an example swivel gearbox 502. FIG. 6A is an enlarged perspective view of the swivel gearbox 502. The gearbox 502 includes an upper gear assembly 602 and a lower gear assembly 604. The upper gear assembly 602 translates the PTO rotation from parallel with the beam 306 to vertical and the lower gear assembly 604 translates the PTO rotation from vertical to parallel with the forward axis of the rear hitch 110. The upper and lower gear assemblies 602, 604 can be reversed (i.e., translation between beam 306 and vertical on bottom, translation between vertical and hitch 110 on top) in other examples. In an example, the upper gear assembly 602 is disposed directly on top of the lower gear assembly 604. That is, the upper and lower gear assembly can be integrated into a single gear unit, the swivel gearbox. By disposing the upper gear assembly 602 directly on top of the lower gear assembly 604 a length of a vertical linkage therebetween is reduced or eliminated as compared to them being further spaced apart. In an example, the distance between a center of the rotation translation of the upper gear assembly 602 and a center of the rotation translation of the lower gear assembly 604 is less than 2 ft.

Reducing the length of this vertical linkage reduces the weight and size of the swivel gearbox 502. Reducing the length of this vertical linkage, however, reduces the ability of such vertical linkage to absorb misalignment between the upper gear assembly 602. In an example, the upper gear assembly 602 is mounted to the connecting beam 306 in a manner that allows the upper gear assembly to move (e.g., rotate) slightly relative to the connecting beam 306 so that the upper gear assembly 602 can absorb force applied thereto due to misalignment between the upper and lower gear assemblies 602. The upper gear assembly 602 can be mounted to the connecting beam 306 with rubber bushings having an appropriate softness such that the bushings can deform (e.g., compress, extend) to allow the upper gear assembly 602 to temporarily move (e.g., rotate) slightly relative to the beam 306. This temporary movement absorbs the force due to temporary misalignment during pivoting of the rear pivot point 404.

Figure 7A:
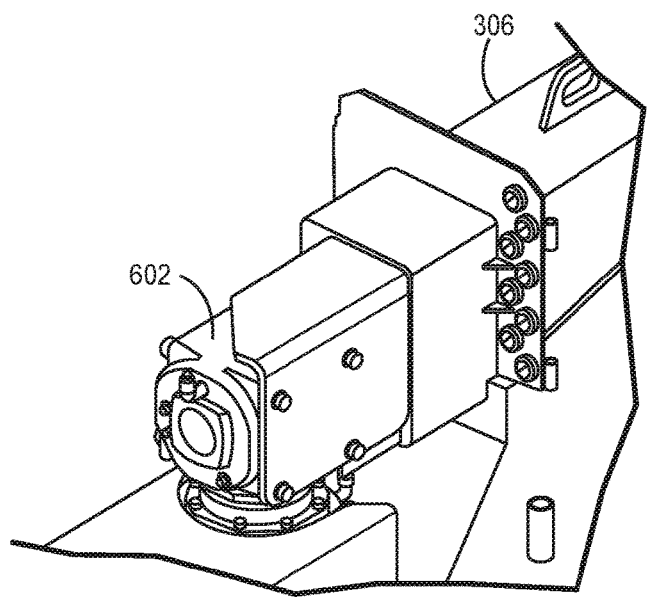
FIG. 7A is a perspective view showing an example mount attaching the upper gear assembly of a swivel gearbox to the connecting beam of the offset arm.
Figure 7B:
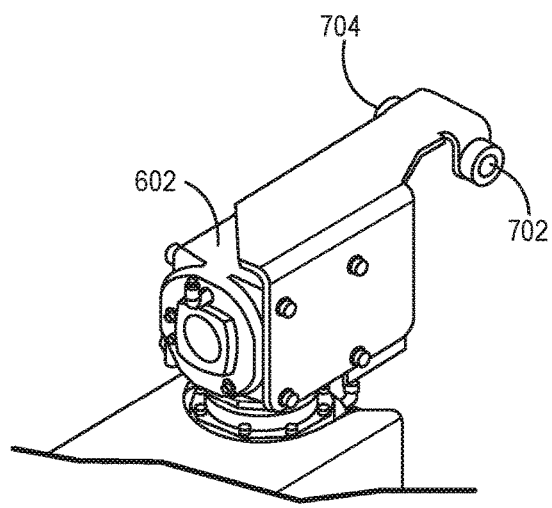
FIG. 7B is a perspective view of the example mount detached from the connection beam and showing example rubber bushings for coupling the upper gear assembly to the connecting beam.

FIG. 7A is a perspective view showing an example mount attaching the upper gear assembly 602 to the connection beam 306. FIG. 7B is a perspective view of the example mount detached from the connection beam 306 and showing the rubber bushings 702, 704. In other examples, the lower gear assembly 604 can include rubber bushings instead of, or in addition to, the bushings on the upper gear assembly 602 to absorb stress thereon. In addition to, or instead of the rubber bushings, the upper or lower gear assembly 602, 604 can be mounted to the connecting beam 306 via a plurality of pins that extend into oversized slots or tubes with rubber bushings that deform allow the pins to move slightly within the slots or tubes. In other examples, other mounts can be used.

A swivel gearbox similar to the swivel gearbox 502 shown in FIGS. 5, 6A, 7A, and 7B can be used for the front swivel gearbox at the front pivot point 402 of the arm 102.

FIGS. 11A, 11B, and 11C are cut-away views of the offset arm 102 showing example PTO shafts connecting the offset arm 102 to the tractor 104 and implement 106, as well as example PTO shafts connecting the front and rear swivel gearboxes. In other examples, other gear assemblies can be used to translate the PTO rotation.

Referring back to FIGS. 3 and 4, the offset arm 102 also has one or more wheels 112 disposed near the back end 304 thereof. As is typical, the wheels 112 rotate (spin) about a respective horizontal center axis, which extends laterally through each wheel 112. In this example two wheels 112 are used, although other numbers of wheels can also be used. The wheels 112 can be non-driven. The wheels 112 are attached to a crossbar 310 that is connected to connecting beam 306 in a manner that does not allow movement of the crossbar 310 relative to the connecting beam 306. That is, the crossbar 310 cannot pivot or move laterally, vertically, or in the forward/backward direction with respect to the beam 306.

In addition to their rotation, the wheels 112 can also each pivot about a respective vertical axis to enable the offset arm 102 to pivot relative to the tractor 104. Pivoting the wheels about their respective vertical axis pivots the wheels with respect to the connecting beam 306 and crossbar 310. FIG. 3 shows the wheels 112 oriented in parallel with the connecting beam 306. FIGS. 4, 5, and 6B show the wheels 112 oriented at an angle relative to the connecting beam 306 and the crossbar 308. Notably, each wheel 112 pivots about its own respective vertical axis proximate the wheel 112s. The offset arm 102 can include an actuator to control orientation of the wheels 112 about their vertical axis. The actuator can control the wheels 112 together, such that all wheels 112 have a common orientation at a given moment. In an example, the actuator is a hydraulic cylinder and the orientation of the wheels 112 is fixed with respect to the other(s) via a rigid assembly 312 (e.g., rods with joints) connecting the axel chassis of the wheels 112 together. Other actuators and means of controlling the wheels 112 together can also be used.

The offset arm 102 provides a communication mechanism between the actuator controlling the wheels 112 and the tractor 104, such that an operator in the tractor 104 can control the orientation of the wheels 112. In an example, the communication mechanism is a hydraulic fluid line that is coupled to the hydraulic cylinder for the wheels 112 and a hydraulic pump on the tractor 104. The communication mechanism enables the orientation of the wheels 112 to be changed by an operator of the tractor 104 while the tractor 104 is pulling the offset arm 102 and any implement 106 connected thereto. Changing the orientation of the wheels 112 changes the angle at which the connecting beam 306 is disposed relative to the tractor 104, and accordingly changes the offset between the front hitch 308 and the rear hitch 110 of the offset arm 102. In an example, the wheels 112 can be pivoted in either direction relative to the connecting beam 306, such that the rear hitch 110 can be offset in either the left or the right direction relative to the front hitch 308. In other examples, the wheels 112 can only pivot in one direction. In operation, an operator of the tractor 104 can change the orientation of the wheels 112 to change the offset position of the implement 106 while the tractor 104 is pulling the offset arm 102 and the implement 106.

FIG. 8 is a perspective view of a rear end of another example offset arm 801. The offset arm 801 can have all the same features as offset arm 102. Offset arm 801 includes a rear pivot lock 802. The rear pivot lock 802 selectively locks and frees (unlocks) the rear pivot point 404 of the offset arm 102. When locked, the rear pivot point 404 is not allowed to pivot (e.g. less than 5 degrees or less than 1 degree), thereby fixing the orientation of the rear hitch 110 relative to the connecting beam 306. When freed, the rear pivot point 404 can pivot freely allowing the angle between the rear hitch 110 and the connecting beam 306 to change freely as well. The rear pivot point 404 can be locked to enable easier backing of the implement 106 and offset arm 801. By locking the rear pivot point 404, the implement 106 is less likely to jackknife while backing because the orientation of the offset arm 801 and the implement 106 are fixed together, removing that degree of freedom from the system. The rear pivot lock 802 can lock the rear hitch 110 in any of multiple orientation positions. Notably, the rear pivot lock 802 can be engaged on-demand during use of the implement 106 to lock the rear hitch 110 in an orientation near its current orientation. Thus, the current orientation of the implement 106 at any given moment can be locked by the rear pivot lock 802. This enables, at a first time, the rear pivot lock 802 to be engaged to lock the rear hitch 110 in a non-offset position (e.g., aligned with) relative to the connecting beam 306. After subsequently releasing the rear pivot lock 802 and allowing the rear hitch 110 to pivot relative to the connecting beam 306, the rear pivot lock 802 can be engaged once again, this time locking the rear hitch 110 at an angle relative to the connecting beam 306. The rear hitch 110 can be locked in different angles (in either direction) at different times.

Figure 9:
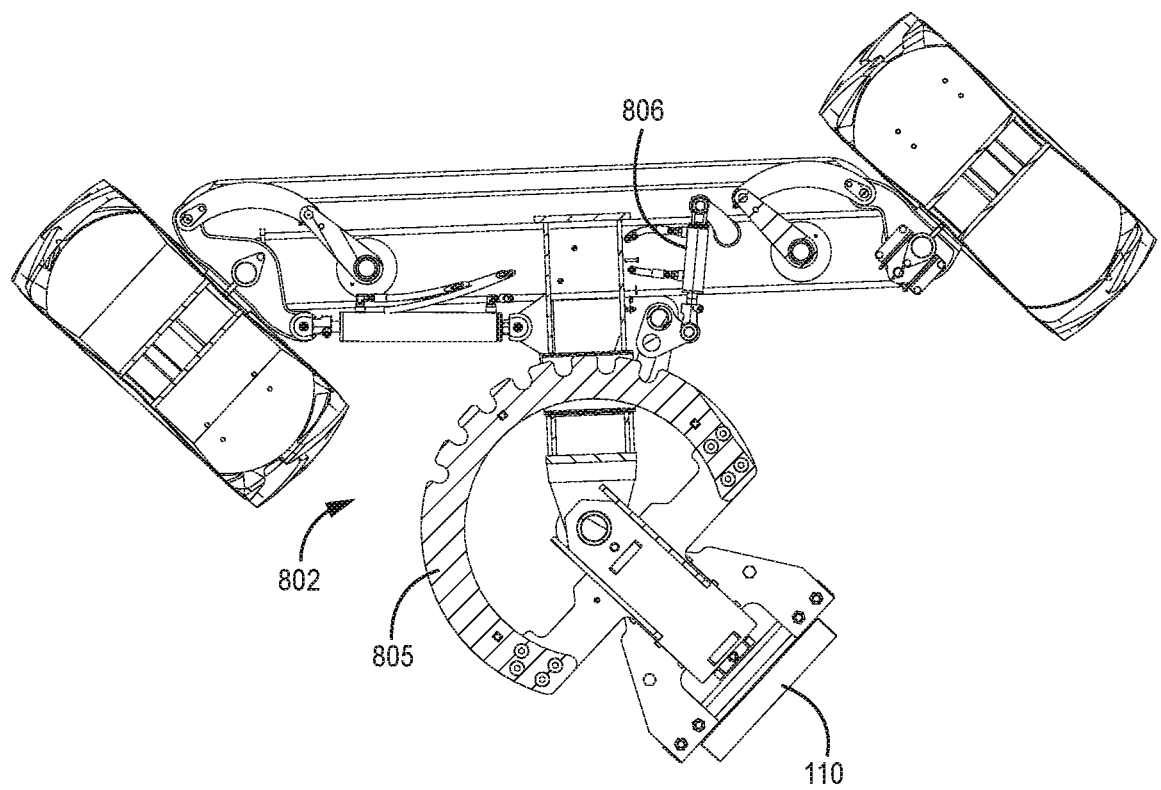
FIG. 9 is a cut-away view of the rear hitch of FIG. 8 showing the selective pivot lock.

FIG. 9 is a cut away view of the rear pivot lock 802. The rear pivot lock 802 includes an arced member 805 defining a plurality of slots therein. The arced member 805 is mounted to the rear hitch 110 such that the arced member 805 pivots with the rear hitch 110 relative to the connecting beam 306. The slots are disposed about the arced surface of the arced member 805 such that as the rear hitch 110 pivots, the arced surface with the slots therein passes by a movable pin 806. The movable pin 806 is attached the connecting beam 306/crossbar 310 portion of the offset arm 102. The movable pin 806 is controlled by an actuator that can selectively move the pin into and out of the slots on the arced member 805. While the rear pivot lock 802 is unlocked and the rear hitch 110 pivots, different slots will come into alignment with the pin. The actuator can be activated to push the pin into whatever slot is currently in alignment with the pin. The contact between the pin 806 and the slots prevents the arced member 805 from moving relative to the pin 806 and thereby locks the orientation of the rear hitch 110 relative to the connecting beam 306.

The offset arm 102 provides a communication mechanism between the actuator controlling the movable pin 806 and the tractor 104, such that an operator in the tractor 104 can control whether the pin 806 is engaged in a slot (locking the rear pivot lock 802) or disengaged from the slots (freeing the rear pivot lock 802). In an example, the communication mechanism is a hydraulic fluid line that couples a hydraulic cylinder as the actuator for the movable pin 806 to a hydraulic pump on the tractor 104. In an example, the hydraulic fluid line for the movable pin 806 is shared with the hydraulic fluid line for the wheel 112 orientation, and a valve controlled by the operate controls which hydraulic pump receives fluid flow from the tractor 104. The communication mechanism enables the movable pin 806 to be engaged/disengaged by an operator of the tractor 104 on-demand while the tractor 104 is pulling the offset arm 102 and any implement 106 connected thereto. Engaging and disengaging the pin 806 locks and unlocks the rear pivot lock 802 and the rear pivot point 404 correspondingly. In other examples, other actuators or locking mechanisms are used, such as a locking mechanism that provides for infinite orientation settings (e.g., using releasable disc brakes pressing against an arced member to lock the orientation).

FIG. 10 is a perspective view of an example front end 302 of the offset arm 102. The front end 302 can include a horizontal pivot point 1002 that enables the connecting beam 306 to pivot about an axis 406 of forward motion of the front hitch 308. This horizontal pivot point 1002 along with the pivoting about the vertical pivot points 402, 404 enables the offset arm to provide a vertical offset of the rear hitch 110 with respect to the front hitch 308. Thus, if the implement 106 is a mower that is offset behind the tractor 104 and the offset positions the mower partially in a ditch of a road while the tractor 104 is on the road, the rotation about the horizontal pivot point 1002 provides a vertical offset that enables the mower to be disposed in the ditch lower than the hitch 108 of the tractor 104. The front end 302 can also include a front pivot lock 1004 that can lock the front pivot point 402 in a non-offset position, for example, while the offset arm 102 is being transported, but not used to offset an implement 106.

FIG. 12 is another top view of the offset arm 102 connected between a tractor 104 and an implement 106 in a non-offset position. In an example, the overall height of the offset arm is 63 inches, the overall width is 117 inches, and the overall length is 23 feet, 6 inches. In an example, the offset arm 102 is configured to angle the connecting beam 306 anywhere from 0 to 50 degrees in both the right and left directions relative to the forward/backward axis of the tractor 104. The connecting beam 306, front hitch 308, rear hitch 110, and swivel gearboxes can be composed of any suitable material, such as a metal.

What is claimed is:

1. An implement for a tractor comprising:
a front hitch for connecting to a hitch on a tractor, the front hitch including an orientation lock to lock the orientation of the front hitch to the orientation of the hitch on the tractor;
a rear hitch for connecting to a hitch of a second implement, the rear hitch including an orientation lock to lock the orientation of the rear hitch to the orientation of the hitch of the second implement;
a rigid connecting structure coupling the front hitch to the rear hitch;
a front pivot point pivotally connecting the connecting structure to the front hitch about a vertical pivot axis;
a rear pivot point pivotally connecting the connecting structure to the rear hitch about a vertical pivot axis; and
a rear pivot lock that selectively locks the rear pivot point to lock the orientation of the rear hitch relative to the connecting structure, wherein the rear pivot lock selectively locks the rear hitch in any of multiple orientations.

2. The implement of claim 1, comprising:
an actuator configured to be communicatively coupled to the tractor, such that an operator of the tractor can control the rear pivot lock to lock and unlock the rear pivot point on demand during operation of the tractor.

3. The implement of claim 2, wherein the orientation lock of the front hitch locks the orientation of the front hitch to the orientation of the tractor hitch about at least two of the three perpendicular axes;
wherein the orientation lock of the rear hitch locks the orientation of the rear hitch with respect to the implement hitch about at least two of the three perpendicular axes.

4. The implement of claim 3, wherein the orientation lock of the front hitch locks the orientation of the front hitch to the orientation of the tractor hitch about all three perpendicular axes,
wherein the front hitch includes a forward/backward pivot point which allows pivoting about an axis of forward motion of the tractor,
wherein the orientation lock of the rear hitch locks the orientation of the rear hitch to the orientation of the hitch of the second implement about a vertical axis and the axis of forward motion and allows pivoting about a horizontal axis perpendicular to the axis of forward motion and the vertical axis.

5. The implement of claim 3, comprising:
one or more wheels pivotally coupled to the connecting structure about a respective vertical axis proximate the wheel, such that the one or more wheels pivot about their respective vertical axis to angle the connecting structure relative to the front hitch while the implement is being pulled by a tractor.

6. The implement of claim 5, wherein the connecting structure includes a connecting beam extending from the front pivot point to the rear pivot point and a horizontal crossbar fixed to the connecting beam and disposed perpendicular to the connecting beam, wherein the one or more wheels are attached to the crossbar.

7. The implement of claim 1, comprising:
a front swivel gearbox disposed proximate the front pivot point;
a rear swivel gearbox disposed proximate the rear pivot point;
a first power-take-off (PTO) assembly extending from the front swivel gearbox and configured to connect to a PTO shaft of the tractor to couple the front swivel gearbox to the PTO shaft of the tractor;
a second PTO assembly extending between the front swivel gearbox and the rear swivel gearbox; and
a third PTO assembly extending from the rear swivel gearbox and configured to connect to a PTO shaft of the second assembly to couple the rear swivel gearbox to the PTO shaft of the second implement.

8. The implement of claim 7, wherein the front swivel gearbox translates PTO rotation from the first PTO assembly to a vertical orientation and then to second PTO assembly, wherein the rear swivel gearbox translates PTO rotation from the second PTO assembly to a vertical orientation and then to the third PTO assembly.

9. The implement of claim 8, wherein the front swivel gearbox includes a first gear assembly mounted directly to a second gear assembly, wherein the second gear assembly translates PTO rotation from the vertical orientation to the second PTO assembly, wherein the second gear assembly is mounted to the connecting structure in a manner that allows slight rotation of the second gear assembly relative to the connecting structure,
wherein the second swivel gearbox includes a third gear assembly mounted directly to a fourth gear assembly, wherein the third gear assembly translates PTO rotation from the second PTO assembly to the vertical orientation, wherein the third gear assembly is mounted to the connecting structure in a manner that allows slight rotation of the third gear assembly relative to the connecting structure.

10. The implement of claim 9, wherein the first gear assembly translates PTO rotation from the first PTO assembly to the vertical orientation, wherein the fourth gear assembly translates the PTO rotation from the vertical orientation to the third PTO assembly.

11. The implement of claim 9, wherein the manner that allows slight rotation is one or more rubber bushings that deform to allow the slight rotation.

12. The implement of claim 1, wherein the second implement is one of a mower, rake, seeder, sprayer, aerator, disc, drag, blade, cultivator, plow, baler, or trailer.

13. An offset arm for a tractor comprising:
a front hitch configured to removably connect to a tractor such that the orientation between the tractor and the front hitch is fixed about at least two of the three perpendicular axes;
a rear hitch configured to removably connect to an implement such that the orientation between the implement and the rear hitch is fixed about at least two of the three perpendicular axes;
an elongated rigid structure;
a front pivot point coupling the front hitch to the elongated structure, the front pivot point allowing pivoting between the front hitch and the elongated structure about a first vertical axis with respect to the offset arm;
a rear pivot point coupling the rear hitch to the elongated structure, the rear pivot point allowing pivoting between the rear hitch and the elongated structure about a second vertical axis with respect to the offset arm;
a rear pivot lock selectively locking the rear pivot point to prevent pivoting about the second vertical axis at the rear pivot point; and
an actuator configured to be communicatively coupled to the tractor, such that the rear pivot lock can be locked and unlocked on-demand by an operator of the tractor during operation of the tractor.

14. The offset arm of claim 13, wherein the rear pivot lock includes multiple orientation lock positions.

15. The offset arm of claim 13, wherein the front hitch fixes the orientation between the tractor and the front hitch about a vertical axis and a horizontal axis of the tractor and allows pivoting about a forward/backward axis of the tractor,
wherein the rear hitch fixes the orientation between the implement and the rear hitch about a vertical axis and a forward/backward axis of the implement and allows pivoting about a horizontal axis of the implement.

16. The offset arm of claim 13, comprising:
one or more wheels pivotally coupled to the connecting structure, wherein pivoting the one or more wheels with respect to the connecting structure while pulling the offset arm with an implement connected thereto, offsets the implement with respect to the forward/backward axis of the tractor.

17. The offset arm of claim 13, comprising:
a front swivel gearbox disposed proximate the front pivot point;
a rear swivel gearbox disposed proximate the rear pivot point;
a first power-take-off (PTO) shaft extending from the front swivel gearbox and configured to connect to a PTO shaft of the tractor to couple the front swivel gearbox to the PTO shaft of the tractor;
a second PTO shaft extending between the front swivel gearbox and the rear swivel gearbox; and
a third PTO shaft extending from the rear swivel gearbox and configured to connect to a PTO shaft of the second assembly to couple the rear swivel gearbox to the PTO shaft of the second implement.

18. The offset arm of claim 17, wherein the front swivel gearbox translates PTO rotation from the first PTO assembly to a vertical orientation and then to second PTO assembly, wherein the rear swivel gearbox translates PTO rotation from the second PTO assembly to a vertical orientation and then to the third PTO assembly.

19. The offset arm of claim 18, wherein the front swivel gearbox includes a first gear assembly mounted directly to a second gear assembly, wherein the second gear assembly translates PTO rotation from the vertical orientation to the second PTO shaft, wherein the second gear assembly is mounted to the connecting structure in a manner that allows slight rotation of the second gear assembly relative to the connecting structure,
wherein the second swivel gearbox includes a third gear assembly mounted directly to a fourth gear assembly, wherein the third gear assembly translates PTO rotation from the second PTO shaft to the vertical orientation, wherein the third gear assembly is mounted to the connecting structure in a manner that allows slight rotation of the third gear assembly relative to the connecting structure,
wherein the first gear assembly translates PTO rotation from the first PTO shaft to the vertical orientation, wherein the fourth gear assembly translates the PTO rotation from the vertical orientation to the third PTO shaft.

20. The offset arm of claim 19, wherein the manner that allows slight rotation is one or more rubber bushings that deform to allow the slight rotation.

* * * * *